(12) United States Patent
Perkins

(10) Patent No.: US 12,710,967 B2
(45) Date of Patent: Aug. 18, 2026

(54) SYSTEMS AND METHODS OF MULTIMODAL USER INTERFACE AUTOMATION

(71) Applicant: Verizon Patent and Licensing Inc., Basking Ridge, NJ (US)

(72) Inventor: Kevin Perkins, Wildwood, MO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 275 days.

(21) Appl. No.: 18/419,881

(22) Filed: Jan. 23, 2024

(65) Prior Publication Data

US 2025/0238087 A1 Jul. 24, 2025

(51) Int. Cl.

*G06F 9/451* (2018.01)
*G06F 11/34* (2006.01)
*G06F 11/3668* (2025.01)
*G06N 3/0475* (2023.01)

(52) U.S. Cl.

CPC .......... *G06F 9/451* (2018.02); *G06F 11/3414* (2013.01); *G06F 11/3684* (2013.01); *G06N 3/0475* (2023.01)

(58) Field of Classification Search

CPC .. G06F 9/451; G06F 11/3688; G06F 11/3696; G06F 11/3414; G06F 3/0484; G06F 3/048; G06F 11/3438; G06F 11/34; G06F 11/3684; G06N 3/0475

See application file for complete search history.

(56) References Cited

U.S. PATENT DOCUMENTS

2023/0061035 A1* 3/2023 Zhao .................. G06F 16/9577
2023/0214239 A1* 7/2023 Singh .................. G06N 3/0464 715/704
2023/0360388 A1* 11/2023 Singh .................... G06V 30/10
2024/0386216 A1* 11/2024 Sodhi ..................... G06F 40/40
2025/0013910 A1* 1/2025 Grigore ................. G06Q 10/06
2025/0095802 A1* 3/2025 Gadoury ................ G16H 10/60
2025/0103362 A1* 3/2025 Yaeli ...................... G06F 9/451
2025/0217170 A1* 7/2025 Shaw .................... G06V 20/50

OTHER PUBLICATIONS

Zhang et al., You Only Look at Screens: Multimodal Chain-Of-Action Agents, https://arxiv.org/abs/2309.11436v2, Sep. 21, 2023 (Year: 2023).*

Song et al., Navigating Interfaces with AI for Enhanced User Interaction, https://arxiv.org/abs/2312.11190v1, Dec. 18, 2023 (Year: 2023).*

* cited by examiner

*Primary Examiner* — Nicholas Ulrich

(57) ABSTRACT

Systems and methods provide user interface (UI) automation for multiple types of devices and applications. A computing device stores an objective for automated manipulation of a UI of a user device and conducts an iterative sequence to achieve the objective. The iterative sequence includes capturing current state information of the UI, wherein the current state information includes text and an image of the UI; sending multimodal input to a generative artificial intelligence (AI) system, wherein the multimodal input includes the image of the UI, a text prompt, and the objective; receiving, from the AI system, a predicted next action for the UI based on the multimodal input; initiating a programmatic action to implement the predicted next action on the UI; and recording the programmatic action. The computing device generates, based on the iterative sequence, a UI automation model associated with achieving the objective on the UI.

20 Claims, 5 Drawing Sheets

SYSTEMS AND METHODS OF MULTIMODAL USER INTERFACE AUTOMATION

BACKGROUND

User interface (UI) automation is a valuable tool for automating tasks that are usually performed by humans on digital devices. A UI is the front-end of an application that facilitates interaction with users on their screens (e.g., computer screens, mobile device screens, etc.). The UI may allow a user to input data, select an item, scroll a screen view, arrange icons, etc. UI automation may provide a tool or scripts to replicate user input. UI automation may be used, for example, by developers to test UIs for applications. UI automation may also be used to increase accessibility to graphical user interfaces.

DETAILED DESCRIPTION

The following detailed description refers to the accompanying drawings. The same reference numbers in different drawings may identify the same or similar elements. Also, the following detailed description does not limit the invention.

Many available user interface (UI)-automation tasks are difficult or impossible to complete using available UI automation tools that rely on a single modality, such as images or text. Systems and methods described herein provide a way to interact with digital UIs in an automated fashion through the use of multi-modal generative artificial intelligence (AI). The systems and methods described herein may be applied to desktop web automation as well as automation for mobile platforms.

Previous forms of UI automation rely on a single modality. Many UI automation use cases require reasoning over both text and images, and are not solvable using prior methods. For example, interacting with a map application or an embedded map may require identification of both text (e.g., addresses, locations, etc.) and visual features (e.g., traffic congestion indications, legend symbols, etc.) to determine where to apply appropriate gestures or other input. As another example, some text-lite applications require visual information to make up for a lack of descriptive elements, such as an icon to indicate the location of a search bar. Tasks that include comparing images with text may also prove a challenge, such as ensuring that images actually represent what the surrounding text implies (e.g., whether images in an online shopping application match the product description).

Systems and methods described herein provide a framework that uses a combination of (1) visual and text state information, (2) written objectives and rules, and (3) generative AI to address previously intractable UI automation tasks. The systems and methods provide user interface (UI) automation for multiple types of user devices and applications. In one implementation, a computing device stores an objective for automated manipulation of a UI of a user device and conducts an iterative sequence of actions to achieve the objective. The iterative sequence includes capturing current state information of the UI, wherein the current state information includes an image of the UI and text; sending multimodal input to a generative artificial intelligence (AI) system, wherein the multimodal input includes the image of the UI, a text prompt, and the objective; receiving, from the AI system, a predicted next action for the UI based on the multimodal input; initiating a programmatic action to digitally implement the predicted next action on the UI; and recording the programmatic action. The computing device generates, based on the iterative sequence, a UI automation model of the projected user input associated with achieving the objective on the particular UI, as described further below.

Figure 1:
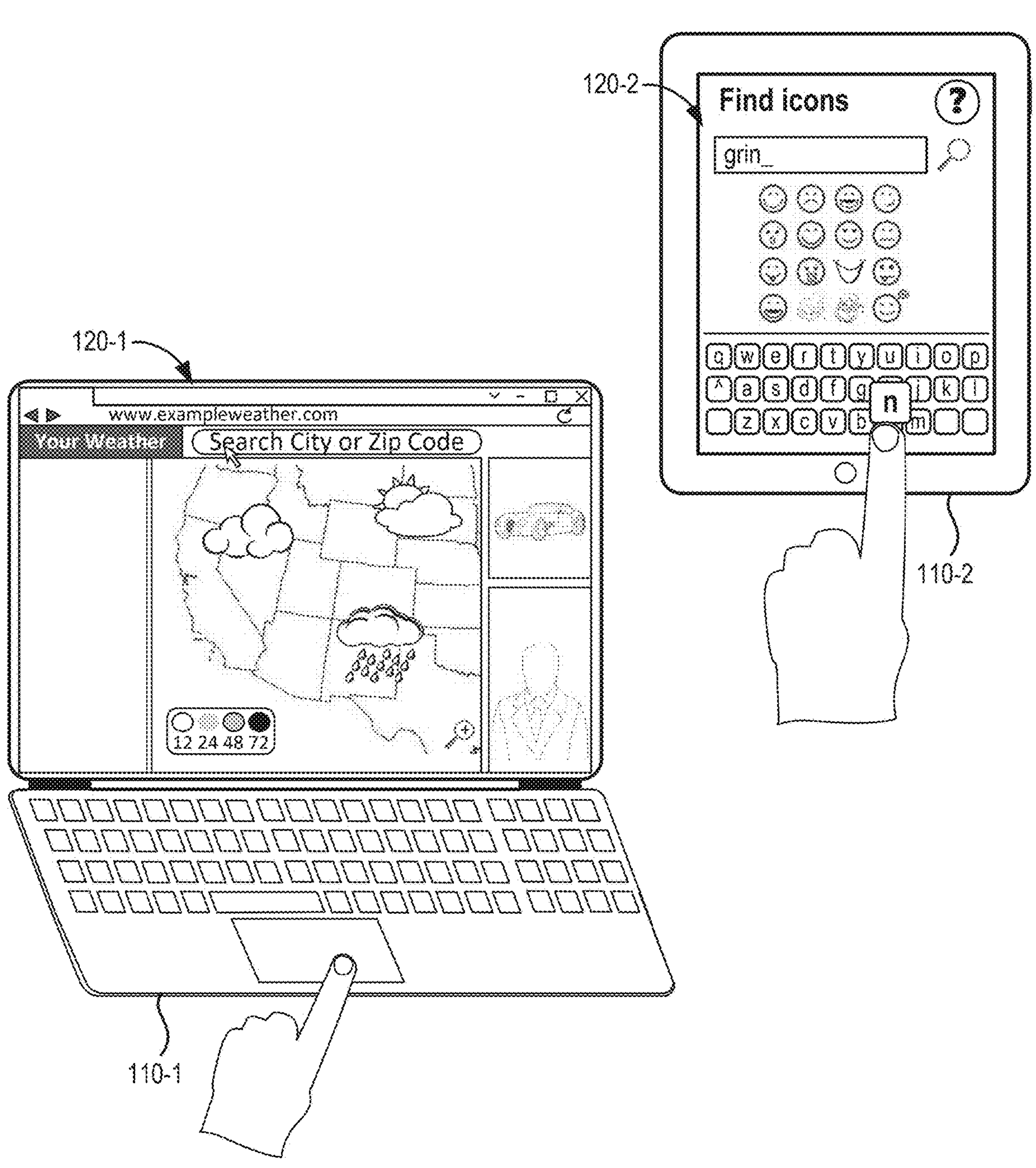
FIG. 1 is a diagram illustrating concepts described herein.

FIG. 1 illustrates an overview of an implementation described herein. User devices 110-1 and 110-2 may come in a variety of form factors (e.g., laptop computer, smart phone, tablet computer, desktop system, etc.). Each user device 110 may have different dimensions and receive different forms of user input (e.g., touch screens, keyboard, mouse, voice, etc.). Each user device 110 can execute a variety of applications, and the same application may have a different UI when executed on different types of user devices. Furthermore, internet services may be provided through a dedicated application which includes one type of UI, while others may be accessed through a web browser with a different UI. For example, user device 110-1 is shown with a UI 120-1 for a weather-related application on a web browser. As another example, user device 110-2 is shown with a UI 120-2 with a search feature that may be included in an operating system.

A sequence of user inputs for a certain application on a certain user device may be used to achieve an objective. As shown in FIG. 1, a user may use a laptop 110-1 to navigate UI 120-1 of a weather-related web page and enter, for example, a zip code for a region of interest to obtain a local weather forecast. As another example, a user of a tablet computer 110-2 may use settings UI 120-2 to perform a search for an emoji to add to a library. It may be desirable for service providers and/or application providers to automate UI activity for purposes of testing, monitoring, quality assurance, etc. Systems and methods described herein may simulate physical user input and determine the sequence of input required to achieve a given objective (e.g., view local weather forecast, retrieve an emoji, etc.). The sequence of user input may be associated with objectives for each type of UI and device combination (e.g., a certain combination of device, application, operating system, etc.). The sequence of user input may be used to form a model associated with achieving the objective on the particular UI. The model may include, for example, a record of each of the UI actions (e.g., clicks, gestures, inputs, etc.) and corresponding network traffic required to achieve an objective. Different models may be generated for different objectives. Service providers may use the model to compare with actual network traffic for various purposes. In one implementation, the model may be used for application fingerprinting (e.g., to associate an application with backend traffic it produces). In other implementations, the model may be applied to analyze network traffic for quality assurance or information gathering purposes.

Figure 2:
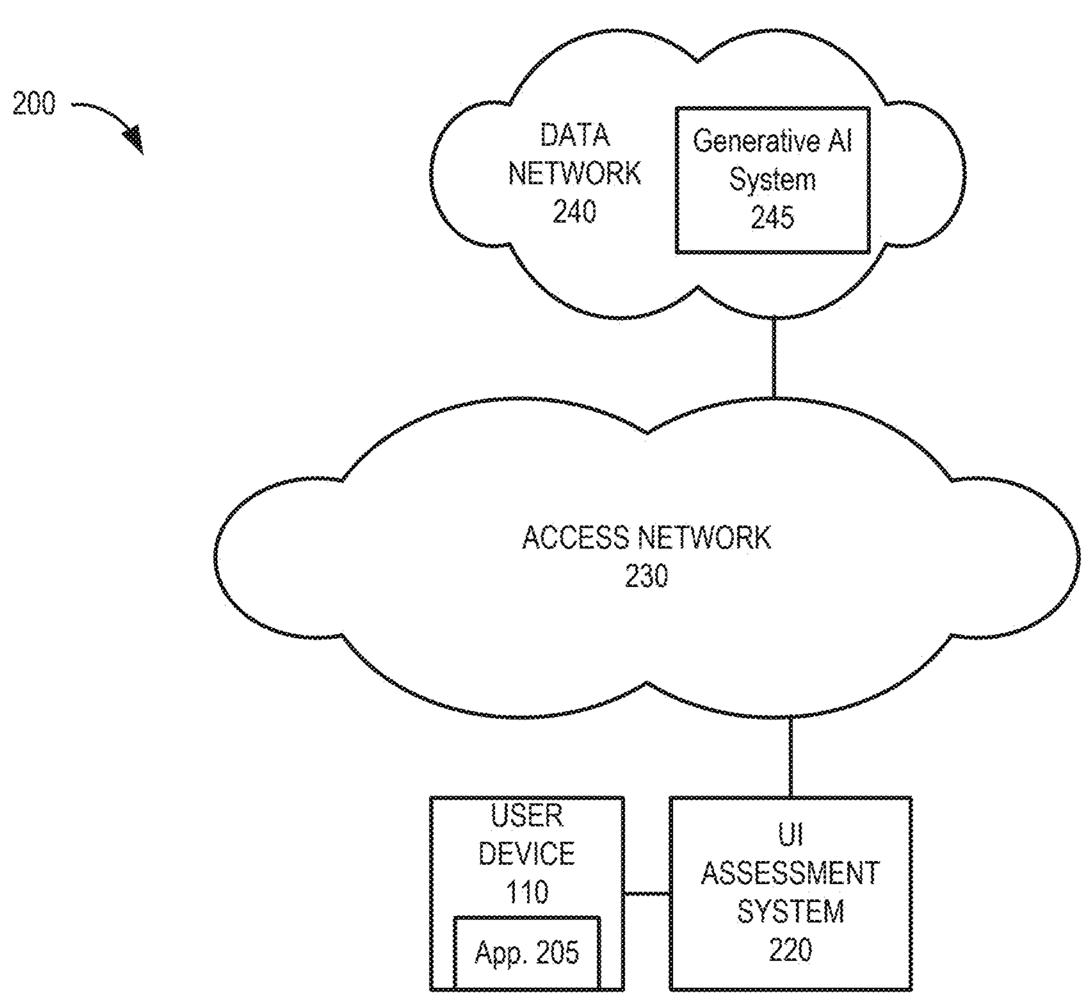
FIG. 2 is a diagram illustrating an environment in which an exemplary embodiment of a UI assessment system may be implemented.

FIG. 2 illustrates an example environment in which systems and/or methods described herein may be implemented. As shown in FIG. 2, environment 200 may include a user device 110, a UI assessment system 220, an access network 230, and a data network 240 that includes a generative AI system 245.

User device 110 may include a portable communication device (e.g., a mobile phone, a smart phone, a tablet device, and/or another type of wireless device); a laptop computer or another type of portable computer; a desktop computer; a media playing device; a portable gaming system; and/or any other type of computer device with communication and output capabilities (e.g., an infotainment system in a vehicle, etc.). In one implementation, user device 110 may be provided with one or more applications 205 (e.g., a browser application, an app designated for a specific purpose, etc.) that include a UI, such as a graphical UI (GUI) that can be manipulate via input mechanisms of user device 110.

UI assessment system 220 may include a computing device, a network device, or a collection of computing devices. UI assessment system 220 may perform an iterative process to accomplish a task on a user interface. UI assessment system 220 may obtain UI state information from user device 110, perform pre-processing of state information, interface with generative AI system to determine a predicted best action (e.g., a simulated user input), and initiate the action via a UI automation tool. After the action is performed, UI assessment system 220 may obtain updated state information to repeat the process to iteratively arrive at a sequence of inputs that achieves a desired objective.

Access network 230 may include one or more wired and/or wireless networks. For example, access network 230 may include a cellular network (e.g., a fourth generation (4G) network, a 4.5G network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, access network 230 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

Data network 240 may include a data network, such as a packet data network. A particular data network 240 may be associated with an Access Point Name (APN), and a user device, such as user device 110 or UI assessment system 220, may request a connection to a particular data network 240 using the APN. Data network 240 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a 5G system and/or an LTE network), an ad hoc network, a telephone network (e.g., the Public Switched Telephone Network (PSTN) or a cellular network), an intranet, or a combination of networks. In some implementations, one or more network functions of data network 240 may be deployed locally (e.g., in an edge network). Data network 240 may include an application server (also referred to as application), such as generative AI system 245. An application may provide services for a program or an application running on UI assessment system 220, for example, and may establish communication sessions with UI assessment system 220 via access network 230.

Generative AI system 245 may include one or more computing devices, such as a server device or a collection of server devices. Generative AI system 245 may be an AI-based third-party vendor service, for example (CHATGPT, CLAUDE AI, GOOGLE BARD AI, IBM WATSON, etc.), capable of processing input from UI assessment system 220. Generative AI system 245 may analyze the input from UI assessment system 220 and detect one or more predicted best actions associated with the input from UI assessment system 220. Generative AI system 245 may provide the predicted best action and/or analysis to the digital UI assessment system 220. Additionally, or alternatively, generative AI system 245 may determine that no actions are available for the given input, and notify UI assessment system 220.

Environment 200 provides one illustrative configuration for implementing UI assessment system 220. In other implementations, UI assessment system 220 may be configured as a distributed component, partly integrated within user device 110, or fully executed within user device 110.

Figure 3:
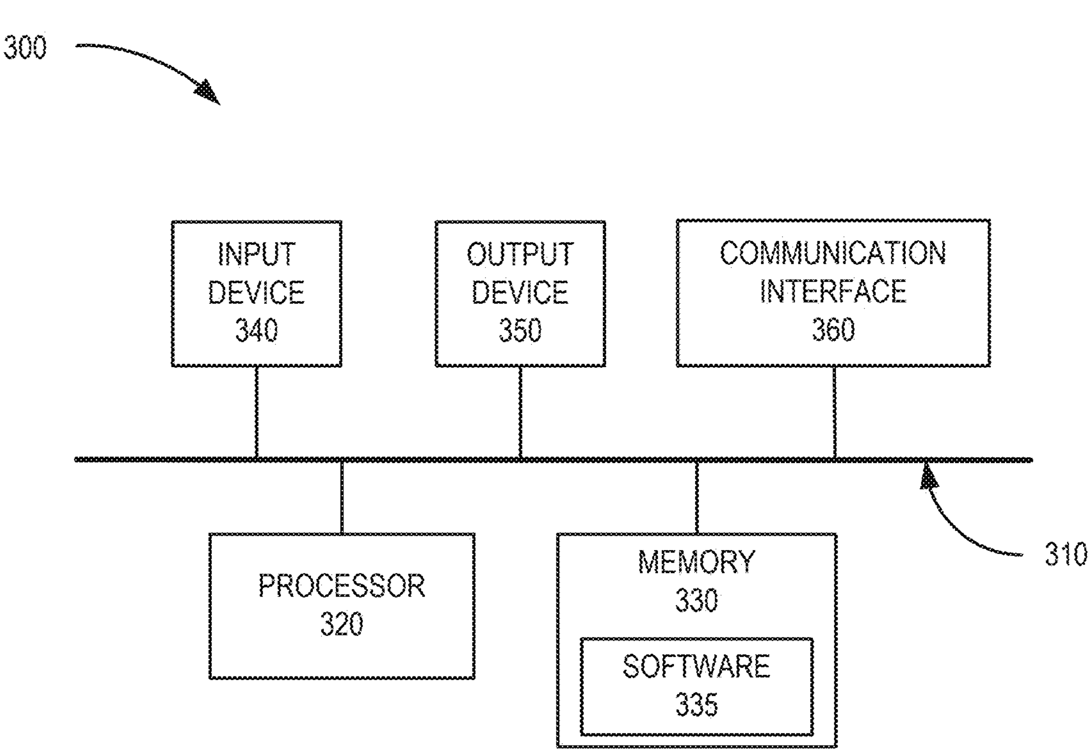
FIG. 3 is a diagram illustrating exemplary components of a device that may correspond to one or more of the devices illustrated herein.

FIG. 3 is a diagram illustrating exemplary components of device 300 according to an implementation described herein. User device 110, UI assessment system 220, generative AI system 245, and other devices in access network 230 or data network 240 may each include one or more devices 300. As shown in FIG. 3, device 300 may include a bus 310, a processor 320, a memory 330 with software 335, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. For example, processor 320 may include one or more Central Processing Units (CPUs) and/or one or more Graphics Processing Units (GPU). In other embodiments, processor 320 may include an application-specific integrated circuit (ASIC), a field-programmable gate array (FPGA), and/or another type of integrated circuit or processing logic. Processor 320 may control operation of device 300 and its components.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Software 335 includes an application or a program that provides a function and/or a process. Software 335 may also include firmware, middleware, microcode, hardware description language (HDL), and/or other form of instruction. By way of example, with respect UI assessment system 220, functional elements of UI assessment system 220 may include software 335 to perform tasks as described herein.

Input device 340 may allow an operator to input information into device 300 and/or to collect information from the environment using one or more sensors. Input device 340 may include, for example, buttons (e.g., a keyboard, keys of a keypad, control buttons, etc.), a mouse, a pen, a joystick, a tracking pad, a stylus, a remote control, a microphone or another audio capture device, an image and/or video capture device (e.g., a camera), a touch-screen display, a light sensor, a gyroscope, an accelerometer, a proximity sensor, a temperature sensor, a barometer, a compass, a health sensor (e.g., pulse rate monitor, etc.), and/or another type of input device. In some implementations, device 300 may be managed remotely and may not include input device 340.

Output device 350 may output information to an operator of device 300 and/or to control device 300 and/or the environment using one or more actuators. Output device 350 may include a display, a printer, a speaker, an actuator to cause device 300 to vibrate, a motor to cause part of device 300 to move, a lock device, and/or another type of output device. For example, device 300 may include a display, which may include a liquid-crystal display (LCD), a light emitting diode (LED) display, an organic LED (OLED) display, an electrophoretic (e.g., electronic ink) display, and/or another type of display device for displaying content to a user. In some implementations, device 300 may be managed remotely and may not include output device 350.

Communication interface 360 may include a transceiver that enables device 300 to communicate with other devices and/or systems via wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to an antenna for transmitting and receiving RF signals. For example, if device 300 is included in user device 110 or UI assessment system 220, communication interface 360 may include an antenna assembly that includes one or more antennas to transmit and/or receive RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a Wi-Fi) card for wireless communications. Communication interface 360 may also include a universal serial bus (USB) port for communications over a cable, a Bluetooth™ wireless interface or an interface for another type of short range (e.g., less than 100 meters) wireless communication method, a radio-frequency identification (RFID) interface, a near-field communications (NFC) wireless interface, a Global Positioning System (GPS) receiver to obtain location information from GPS satellites, an optical transceiver, and/or any other type of interface that converts data from one form to another form.

As will be described in detail below, device 300 may perform certain operations relating to graphical network design and configuration tools. Device 300 may perform these operations in response to processor 320 executing software instructions (e.g., software 335) contained in a computer-readable storage medium, such as memory 330. A computer-readable storage medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
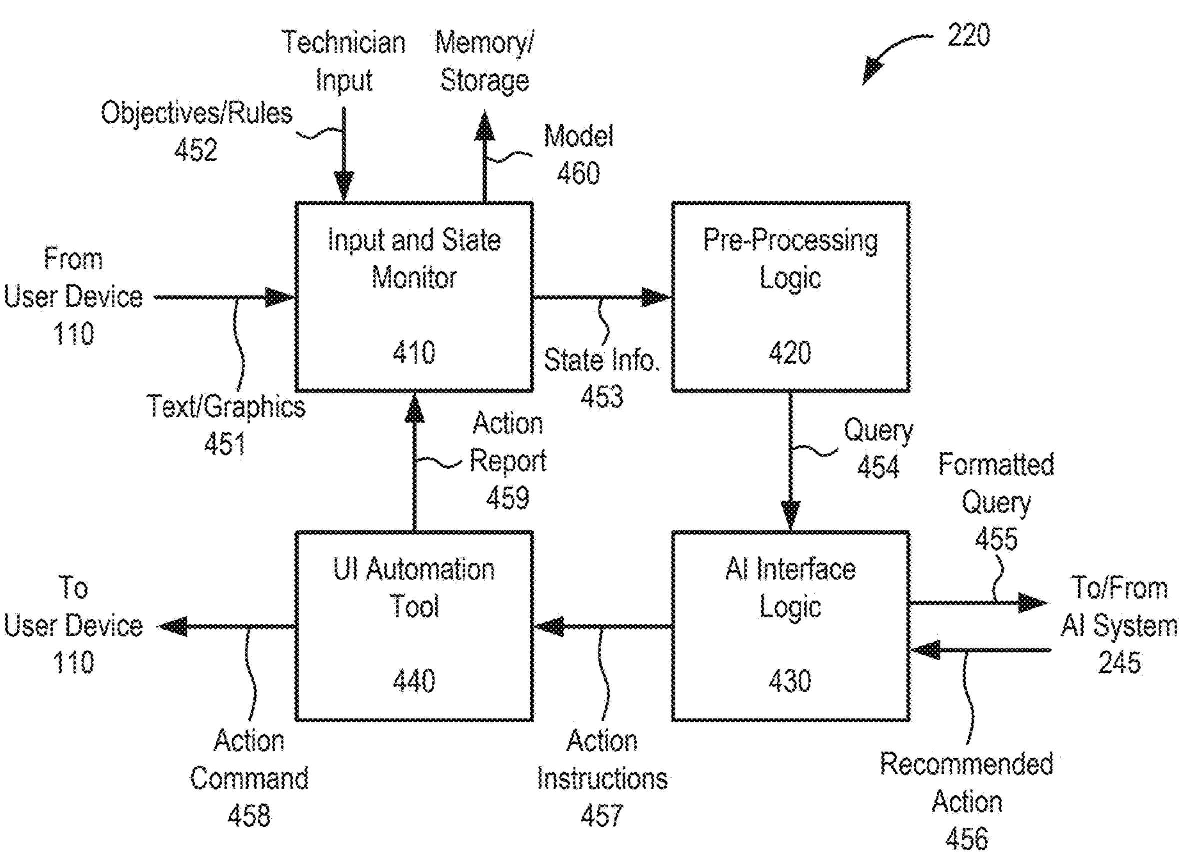
FIG. 4 is a block diagram illustrating communications among exemplary logical components of a UI assessment system that may be used in the environment of FIG. 2.

FIG. 4 is a diagram illustrating communications among exemplary logical components of UI assessment system 220, according to an implementation. UI assessment system 220 may be a standalone system or distributed within one or multiple devices of environment 200. The logical components of UI assessment system 220 may be implemented, for example, via processor 320 executing instructions from memory 330. Alternatively, some or all of the functional components included in UI assessment system 220 may be implemented via hard-wired circuitry. As shown in FIG. 4, UI assessment system 220 may include an input and state (I&S) monitor 410, pre-processing logic 420, AI interface logic 430, and a UI automation tool 440.

I&S monitor 410 may collect, from user device 110, visual and textual state information for an application. For example, tools such as XCODE UIApplication, ANDROID Debug Bridge (ADB), SELENIUM, etc., may be used to gather UI hierarchical information (e.g., from UI source code or other UI code), as well as screenshots of a mobile application executed on user device 110. As shown in FIG. 4, I&S monitor 410 may collect visual and textual state information from user device 110 as text/graphics 451. State information may indicate, for example, a step in a sequence that may be compared against state information indicating past or future steps.

Additionally, I&S monitor 410 may obtain objectives regarding a UI action. Objectives may be provided by a technician (or user) of UI assessment system 220 conducting testing and may vary depending on what the testing is intended to accomplish. An objective may be relevant to an application on multiple different platforms. For example, an objective may include a directive to sign up for a free account and add an item to a shopping cart. As another example, an objective may include obtaining directions to an address or finding a location on a map. I&S monitor 410 may receive objectives in a natural language format or as structured input. For example, in one implementation, I&S monitor 410 may include a separate user interface (for presentation on UI assessment system 220) to solicit an objective from a technician.

I&S monitor 410 may also obtain rules to apply when using the UI on user device 110. Rules may include information needed to perform objectives and may be provided by a technician (or user) of UI assessment system 220 conducting testing. Rules may include descriptions of how to proceed if certain scenarios are encountered. For example, a rule may indicate a particular email address (e.g., example1@email.com) to use to create an account and/or a different email address (e.g., example2@email.com) when a second/confirmation email address is requested. As another example, rules may identify guidelines for passwords or other input data. Rules may also include app developer guidelines and/or policies for automated interaction (e.g., robots.txt). Rules may be provided as particular text file, natural language, structured input, etc., via the user interface of I&S monitor 410. As shown in FIG. 4, I&S monitor 410 may collect objectives and rules (e.g., from a technician or input file) as objectives/rules 452.

Pre-processing logic 420 may receive information from I&S monitor 410 and may perform pre-processing of the information. As shown in FIG. 4, pre-processing logic 420 may receive textual and visual information, objectives, and rules from I&S monitor 410 as state information 453. Pre-processing may include detecting changes in state (e.g., changes between a current state and a previously detected state), performing prompt engineering, and applying relevant rules/objectives.

Pre-processing logic 420 may identify changes in UI state and reduce the complexity of inquiries provided to generative AI system 245. Prompt engineering may adjust how input to a generative AI system is provided to increase the probability of receiving recognizable or useful responses from the generative AI system (e.g., generative AI system 245). Prompt engineering may iteratively change the wording of code sections or shorten component hierarchy to allow for better processing by an AI system. For example, pre-processing logic 420 may obtain source code data (e.g., an HTML file) from a website that is being tested. Rather than providing the entire source code to generative AI system 245, pre-processing logic 420 may reduce the total text size to what is permitted in a Large Language Model (LLM) prompt for the AI system. Pre-processing logic 420 may apply its own process (e.g., using a PYTHON script or the like) to compress and/or shorten the amount of text (e.g., in the HTML file or other UI-related code) that is to be passed along to the generative AI system. For example, pre-processing logic 420 may eliminate sections of code that are irrelevant to user input generally or a particular objective and provide only the relevant sections. Irrelevant code sections may include, for example, certain panes, boarders, or scripts of a web page that are unrelated to user input or code for portions of a UI that not visible at the time of the input. In another implementation, pre-processing logic 420 may select keywords from the UI code, and/or filter out unnecessary elements, to reduce input size. As shown in FIG. 4, pre-processing logic 420 may provide a query to AI interface logic 430 as query 454.

AI interface logic 430 may include communication/control interface logic to exchange command and control signals with generative AI system 245 for providing queries based on information from pre-processing logic 420. For example, interface logic 430 may receive query 454 and may generate a service request for a predicted best action based on a current state of the UI on user device 110. The service request may include information from query 454 in a format suitable for a particular generative AI system 245. As shown in FIG. 4, AI interface logic 430 may provide the service request to generative AI system 245 as formatted query 455. In one implementation, formatted query 455 may provide an image (e.g., a screen shot or modified image) and a text prompt (e.g., as modified by pre-processing logic 420) as input to request a predicted best action from generative AI system 245. Generative AI system 245 may receive the input and respond with the predicted best action in the form of code or a natural language instruction that can be converted into code. For example, AI interface logic 430 may receive a response to formatted query 455 as recommended action 456. Recommended action 456 may include instructions to enter text into the UI, select an icon, perform an image manipulation (e.g., zoom, scroll, etc.), or the like. AI interface logic 430 may receive recommended action 456, convert the recommended action to instructions (if necessary) that UI automation tool 440 can understand, and provide the instructions to UI automation tool 440. For example, AI interface logic 430 may forward recommended action 456 to UI automation tool 440 as action instructions 457.

UI automation tool 440 may perform the recommended actions on the user interface of user device 110. For example, UI automation tool 440 may receive, via AI interface logic 430, action instructions 457 with the recommended action from generative AI system 245. UI automation tool 440 may perform a programmatic action to effectuate the recommended action (e.g., simulating a physical user action, such as a click, swipe, touch, character input, or another type of user input) without a physical user's manual interaction with the UI. For example, as shown in FIG. 4, UI automation tool 440 may provide a programmatic action to user device 110 as action command 458. Depending on the type of user device 110, examples of UI automation tool 440 may include SELENIUM WEBDRIVER, ABD, XCODE UIApplication, and the like. Programmatic actions initiated by UI automation tool 440 may, for example, cause a change in state of the UI of user device 110. The programmatic actions may include simulated physical user input, such as text input, object selection, mouse movement, touch gestures, voice commands, etc.

The programmatic actions and corresponding changes in state may be tracked by I&S monitor 410, which may trigger another iteration assessment and input by UI assessment system 220. For example, UI automation tool 440 may provide to I&S monitor 410 an action report 459 indicating actions taken on the user interface of user device 110. Action report 459 may trigger I&S monitor 410 to retrieve updated state information (e.g., text/graphics 451) from user device 110 for additional processing. In one implementation, I&S monitor 410 may collect multiple action reports 459 as UI assessment system 220 cycles through iterations to perform an objective. The multiple action reports 450 may be collected as a model 460 for the objective and stored in a memory or storage (e.g., memory 330) for eventual distribution. In one implementation, model 460 may include a collection of programmatic actions, from action reports 459, that indicate the sequence of actions used to obtain the objective. In another implementation, model 460 may include a listing of action commands (e.g., action commands 458), recommended actions (e.g., recommended actions 456), and/or corresponding action instructions (e.g., action instructions 457). In still another implementation, model 460 may include the sequence of actions required to achieve an objective along with the corresponding state changes or network traffic for each action. Model 460 may be adjusted or updated, for example, through multiple iterations.

Although FIG. 4 describes certain logical components of UI assessment system 220 in other implementations, UI assessment system 220 may include fewer logical components, different logical components, or additional logical components than depicted in FIG. 4. Additionally or alternatively, one or more logical components of UI assessment system 220 may perform functions described as being performed by one or more other logical components.

Figure 5:
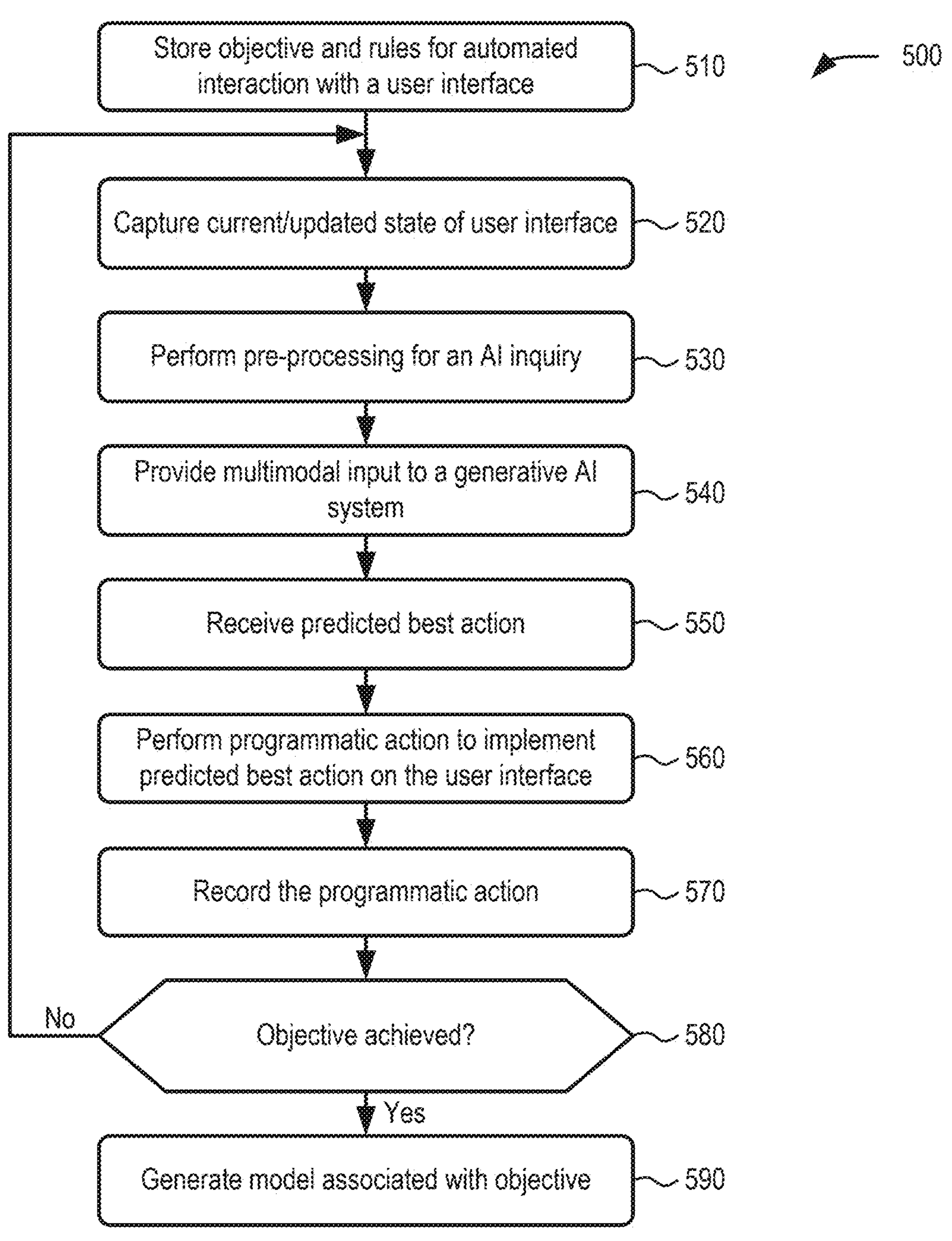
FIG. 5 is a flow diagram illustrating a process of using a UI assessment system, according to an implementation described herein.

FIG. 5 is a flow diagram illustrating an exemplary process 500 for using UI assessment system 220, according to an implementation described herein. In one implementation, process 500 may be implemented by UI assessment system 220. In another implementation, process 500 may be implemented by UI assessment system 220 and user device 110. In still other implementations, process 500 may be implemented by UI assessment system 220 in conjunction with one or more other devices in environment 200. Some process blocks of FIG. 5 may be described in the context of components of FIG. 4.

Referring to FIG. 5, process 500 may include storing an objective and rules for automated interaction with a user interface (block 510). For example, I&S monitor 410 may receive and store, in memory, an objective regarding a UI action for a particular application executing on user device 260. The objectives may be provided by a technician of UI assessment system 220, for example, for testing particular feature or function of the user interface. I&S monitor 410 may also receive and store rules for accomplishing the objective, such as developer guidelines and how to proceed if certain scenarios are encountered.

Process 500 may further include capturing a current state of the user interface (block 520). For example, I&S monitor 410 may capture a screenshot of the current state of a user interface shown on user device 260 along with the component hierarchy of the UI code (e.g., webpage code, display code, etc.) for the user interface of user device 110.

Process 500 may also include performing pre-processing for an AI inquiry (block 530) and providing multimodal input to a generative AI system (block 540). For example, pre-processing logic 420 may receive state information 453 from I&S monitor 410 and perform pre-processing to detect changes in state (e.g., between past and current UI interface information), shorten component hierarchy to what applies to the detected changes, and apply the relevant rules and/or objective. Based on information from pre-processing logic 420, AI interface logic 430 may generate a service request (e.g., formatted query 455), including both images and text/code, to generative AI system 245.

Process 500 may additionally include receiving a predicted best action (block 550) and performing a programmatic action to implement the predicted best action on the user interface (block 560). For example, a generative AI system (e.g., generative AI system 245) may provide a response to the multimodal input received from AI interface logic 430. As described in connection with FIG. 4, in response to formatted query 455, AI interface logic 430 may receive a recommended action 456 in the form of natural language instructions, code, a script, or another format. The recommended action may include a next step in a sequence to achieve the objective (e.g., objective 452) for the user interface test. After formatting, if required, UI automation tool 440 may provide to user device 110 the recommended action (e.g., action command 458) for implementation.

Process 500 may further include recording the programmatic action and an updated state of the user interface (block 570). For example, UI automation tool 440 may provide an indication (e.g., action report 459) that input to the user interface of user device 110 has been initiated. In response to the indication, or as a periodic activity, I&S monitor 410 may collect updated state information (e.g., updated text/graphics 451) for processing and iterative progression toward completing the test objective.

If the objective is not achieved after performing the programmatic action (block 580—No), process 500 may return to process block 520 to identify the current/updated state of the user interface, which will begin another iteration of the process. If the objective is achieved after performing the programmatic action (block 580—Yes), process 500 may generate a model associated with the objective (block 590). For example, UI assessment system 220 may compile the collection of actions reported to I&S monitor 410 and associate those actions with the achieved objective (e.g., as provided in objectives/rules 452) in a UI automation model (e.g., model 460). In some aspects, the UI automation model may be used, for example, to associate actions on mobile applications with the backend traffic they produce and perform for quality assurance monitoring. In other aspects, the UI automation model may be used to test new UIs and UI updates.

The foregoing description of embodiments provides illustration, but is not intended to be exhaustive or to limit the embodiments to the precise form disclosed. In the preceding description, various embodiments have been described with reference to the accompanying drawings. However, various modifications and changes may be made thereto, and additional embodiments may be implemented, without departing from the broader scope of the invention as set forth in the claims that follow. The description and drawings are accordingly to be regarded as illustrative rather than restrictive.

In addition, while series of communications and blocks have been described with regard to the processes illustrated in FIGS. 4 and 5, the order of the communications and blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 320, etc.), or a combination of hardware and software (e.g., software 335). The embodiments have been described without reference to the specific software code since the software code can be designed to implement the embodiments based on the description herein and commercially available software design environments/languages.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 320) of a computational device. A non-transitory storage medium includes one or more of the storage mediums described in relation to memory 330.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction described in the present application should be construed as critical or essential to the embodiments described herein unless explicitly described as such.

What is claimed is:

1. A method comprising:

storing, on a computing device, an objective for automated manipulation of a user interface (UI) of a user device;

conducting, by the computing device, an iterative sequence on the UI to achieve the objective, wherein the iterative sequence includes:

capturing current state information of the UI, wherein the current state information includes text and an image of the UI, detecting changes in the current state information from stored previous state information, selecting, from a component hierarchy of code for the UI, relevant sections related to the changes in the current state information, sending multimodal input to a generative artificial intelligence (AI) system, wherein the multimodal input includes the image of the UI, a text prompt, the objective, and the relevant sections, receiving, from the generative AI system, a predicted next action for the UI based on the multimodal input, initiating a programmatic action to implement the predicted next action on the UI, recording the programmatic action; and generating, by the computing device and based on the iterative sequence, a UI automation model associated with achieving the objective.

2. The method of claim 1, wherein capturing includes obtaining the image of the UI and the component hierarchy.

3. The method of claim 1, wherein the UI includes one of:

a graphical user interface (GUI) for an application executed on the user device, a GUI for a web browser executed on the user device, or a UI of an application that is embedded in another application.

4. The method of claim 1, further comprising:

storing, on the computing device, rules governing actions related to the objective.

5. The method of claim 4, wherein the iterative sequence further includes:

selecting, from the rules, relevant rules related to the changes in the current state information, wherein the multimodal input further includes the relevant rules.

6. The method of claim 1, wherein the iterative sequence further includes:

performing prompt engineering to shorten the component hierarchy for the text prompt.

7. The method of claim 1, wherein initiating a programmatic action includes simulating a physical user action on the UI.

8. The method of claim 1, wherein the UI automation model includes a sequence of programmatic actions for achieving the objective.

9. A device comprising:

a communication interface; and one or more processors configured to:

store in a memory an objective for automated manipulation of a user interface (UI) of a user device;

conduct an iterative sequence to achieve the objective, wherein the iterative sequence includes:

capturing current state information of the UI, wherein the current state information includes text and an image of the UI, detecting changes in the current state information from stored previous state information, selecting, from a component hierarchy of code for the UI, relevant sections related to the changes in the current state information, sending multimodal input to a generative artificial intelligence (AI) system, wherein the multimodal input includes the image of the UI, a text prompt, the objective, and the relevant sections, receiving, from the generative AI system, a predicted next action for the UI based on the multimodal input, initiating a programmatic action to implement the predicted next action on the UI, and recording the programmatic action; and generating, based on the iterative sequence, a UI automation model associated with achieving the objective.

10. The device of claim 9, wherein capturing includes obtaining the image of the UI and the component hierarchy.

11. The device of claim 9, wherein the UI includes one of:

a graphical user interface (GUI) for an application executed on the user device, a GUI for a web browser executed on the user device, or a UI of an application that is embedded in another application.

12. The device of claim 9, wherein the one or more processors are further configured to:

store, in the memory, rules governing actions related to the objective.

13. The device of claim 12, wherein, when conducting the iterative sequence, the one or more processors are further configured to:

select, from the rules, relevant rules related to the current state information, wherein the multimodal input further includes the relevant rules.

14. The device of claim 12, wherein, when conducting the iterative sequence, the one or more processors are further configured to:

select, from the rules, relevant rules related to the changes in the current state information, wherein the multimodal input further includes the relevant rules.

15. The device of claim 9, wherein, when conducting the iterative sequence, the one or more processors are further configured to:

shorten the component hierarchy prior to sending the multimodal input.

16. The device of claim 9, wherein, when initiating the programmatic action, the one or more processors are further configured to:

simulate a physical user action on the UI.

17. The device of claim 9, wherein the UI automation model includes a sequence of programmatic actions for achieving the objective.

18. A non-transitory, computer-readable storage medium storing instructions executable by a processor of a computing device for:

storing, in a memory, an objective for automated manipulation of a user interface (UI) of a user device;

conducting, by the computing device, an iterative sequence to achieve the objective, wherein the iterative sequence includes:

capturing current state information of the UI, wherein the current state information includes text and an image of the UI, detecting changes in the current state information from stored previous state information, selecting, from a component hierarchy of code for the UI, relevant sections related to the changes in the current state information, sending multimodal input to a generative artificial intelligence (AI) system, wherein the multimodal input includes the image of the UI, a text prompt, the objective, and the relevant sections, receiving, from the generative AI system, a predicted next action for the UI based on the multimodal input, initiating a programmatic action to implement the predicted next action on the UI, and recording the programmatic action; and generating, by the computing device and based on the iterative sequence, a UI automation model associated with achieving the objective.

19. The non-transitory, computer-readable storage medium of claim 18, further storing instructions executable by the processor of a computing device for:

storing rules governing actions related to the objective, and sending, to the generative AI system, the rules.

20. The non-transitory, computer-readable storage medium of claim 18, wherein the instructions for conducting the iterative sequence further include instructions executable by the processor of a computing device for:

repeating the iterative sequence, if the objective is not achieved after initiating the programmatic action.

* * * * *